July 17, 1928.
R. E. MARTIN
1,677,353
ANTISKID DEVICE
Filed Oct. 4, 1927
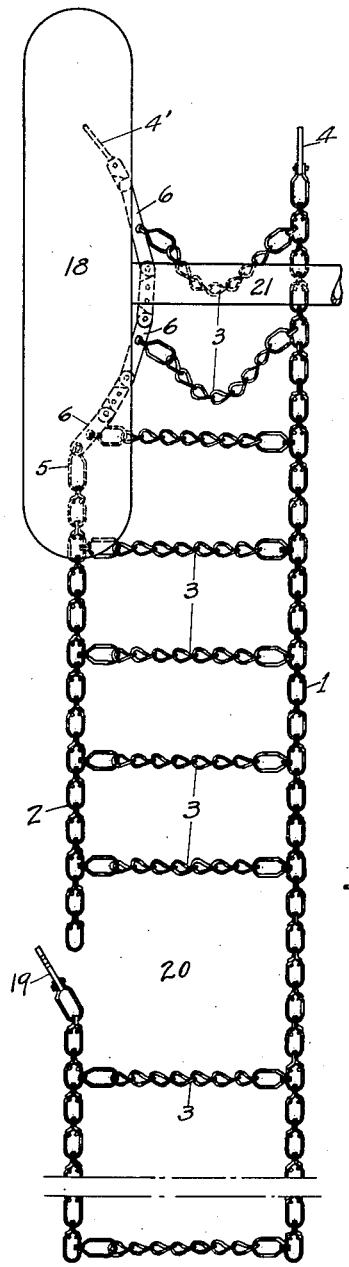
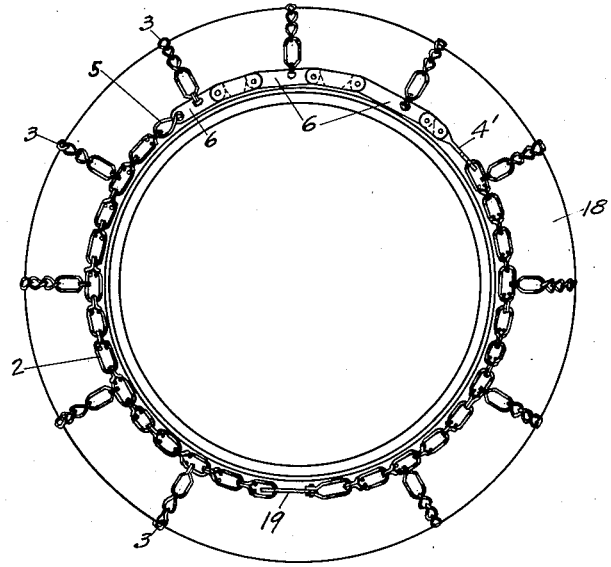
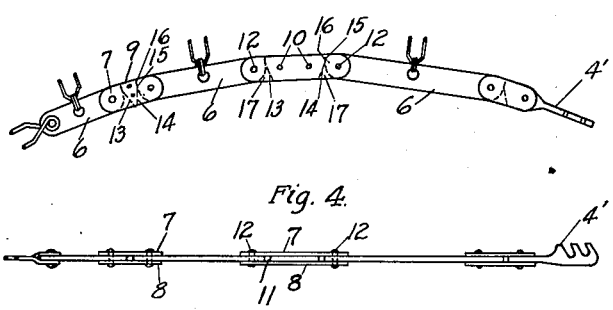
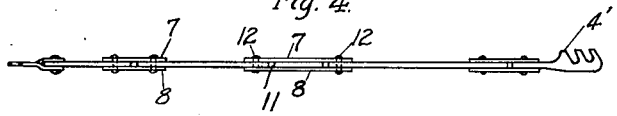
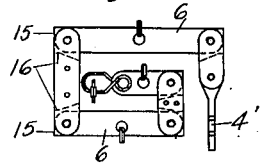
Inventor
Royal E. Martin
By John X. Boss
his Attorney Patented July 17, 1928.

1,677,353

UNITED STATES PATENT OFFICE.

ROYAL E. MARTIN, OF MANSFIELD, OHIO.

ANTISKID DEVICE.

Application filed October 4, 1927. Serial No. 223,920.

This invention relates to an anti-skid device for motor car tires or the like.

It is well known that the types of antiskid chains constructed of a series of conventional universally yielding links are difficult to drape over the tire because the links when not draped on a tire or the like are usually kept in a tangled, mixed, confused, jumbled and irregular state or mass, making it difficult to handle and straighten out the chains preparatory to and in draping the chains over the tire, and connecting the ends thereof for use.

It is also well known that in draping the chain on the tire that the user must get in close proximity to the tire and other parts of the car in order to place the chain in proper position, thereby causing much discomfort and inconvenience to the user and liability of soiling his clothes.

One of the objects of the invention is to provide means for keeping a pre-determined number of the cross links of the anti-skid device spaced apart in uniform relation to each other, preparatory to and in draping the anti-skid device over and around the periphery of the tire or the like.

Another object is to provide means for efficiently and conveniently handling the anti-skid device, so as to place it in proper position underneath the axle of the car, preparatory to and in draping same on the tire or the like, without discomfort or soiling the clothes of the user.

A further object is to provide means to be used in association with the conventional links of the chains that will maintain a predetermined number of the links of the chain in a curvature substantially the same as that of the wheel preparatory to draping the chains on the tire and connecting the ends thereof.

Another object is to provide means attachable to the links of the chains of the anti-skid device that will maintain the uniform positions of a pre-determined number of cross links of the anti-skid device with respect to each other, but at the same time permit the means to yield in one direction to permit folding in a compact form.

A further object is to provide a semi-rigid means to permit convenient handling to straighten out and untangle the side chains and provide means for positioning the chains of the anti-skid device over the tire and connect the ends of the side chains.

These and other objects are attained by the construction of an anti-skid device such as shown and illustrated in the accompanying drawings in which:

Fig. 1 is a plan view of an anti-skid chain, showing the device attached to one of the side chains and in position underneath the axle of a car.

Fig. 2 is a side elevation of a tire and anti-skid chain, showing the invention used in association therewith.

Fig. 3 is a side elevation of a plurality of connecting members and links showing the preferred embodiment of the invention.

Fig. 4 is an inner view of Fig. 3.

Fig. 5 is a side elevation of the invention showing the connecting members and links in folded position.

In the drawing reference numerals 1 and 2 indicate the side chains and 3 a series of the cross chains of a conventional type of anti-skid chain. The means of connecting the ends of the side chains is indicated by reference numeral 4. To affix the invention to the conventional types of anti-skid chains one of the side chains is preferably made shorter in length as indicated by side chain 2. The device is pivotally connected to the end 5 of the chain 2 and extends to the end of the chain 1.

The device is preferably made of a plurality of connecting members and links which are constructed and assembled as follows: Links 6 of pre-determined and variable lengths are provided with apertures therein adjacent to each end, a connecting member preferably constructed of plates 7 and 8 having a filler block 9 interposed therebetween, is provided and united together by rivets 10 or the like. The filler block is made shorter in length than the plates 7 and 8 providing slots 11 at each end to receive at each end one end of a link 6.

The connecting members are pivotally attached to the links by pins 12 or the like. The filler blocks 9 are cut away as shown at 13 and 14 for clearance. The ends of the links are provided with flat portions 15 to abut against similar flat portions 16 formed in alinement therewith on the filler blocks 9 to provide a stop. The ends of the links are also cut away or formed with rounded ends to provide for clearance, as shown at 17. The construction described permits the links and connecting members to yield in one direction and prevents them from yielding in the opposite direction when the flat portions at the ends of the links abut against the flat portions of the filler blocks, as shown in Fig. 3.

The flat stop portions of the links and filler blocks are so arranged and positioned that when they are abutting against or in contact with each other, they will hold the links and connecting members in a segment of a circle that will substantially conform to the size or diameter of the tire or the like.

It will be noted that the connecting members and links, when it is desired to fold same, can be pivoted or wrapped around each other as shown in Fig. 5 in a compact package, when the anti-skid device is not in use.

The connecting means 4' that is attached to the end link 6 is bifurcated and pivotally secured thereto and its end is adapted to abut against the end of said link to hold same in a pre-determined position in a manner similar to the other links and connecting members, hereinbefore described. It will be also noted that the cross links 3 are attached to apertures provided in the links 6 at one end and the opposite ends are attached to the links of the chain 1.

The chain 1 is preferably made continuous, as shown in Fig. 1, but its companion chain 2 is preferably made separable and connected by a hook fastening means or the like 19. One of the cross links of the chain is preferably omitted, leaving an enlarged space 20 between the cross links for a purpose hereinafter described.

In the use of the anti-skid device, the user preferably grasps the link 6 that is connected to the end 5 of the chain 2 and passes it under the axle 21 of the car to the position shown in Fig. 1, and then turns the edges of the connecting members and links up. He then pulls the connecting members, links, chain 2 and chain 1 forward until the space 20 alines with the portion of the tire that is in contact with the ground.

The hook 19 on the side chain 2 is then connected with the other separate portion of the chain 2. The user then lifts the connecting members and links, chain 2 and chain 1 over and on top of the tire and then drapes same over the tire in the conventional manner and then connects the end of the connecting members and links to the end of chain 2 and then connects the ends of chain 1.

It will be noted that the anti-skid device, described herein, can be placed or draped upon the tire without jacking up the axle of the car if desired. The construction of one of the chains of separate parts is especially useful in the event that the car is stalled in mud or the like where it is difficult to get traction, or use a jack. Attention is called to the fact that the user can insert the chain and the connecting members and links of the device underneath the axle without discomfort or liability to soil his clothes to the position desired, without coming in close proximity to any part of the car or tire.

I claim:

In an anti-skid device, side chains, cross chains connecting the side chains, and a member forming part of the length of one of the side chains, said member including a series of movably interconnected parts adapted for relative folding in one direction, said members being formed to prevent relative movement in the opposite direction beyond a line conforming substantially to the curvature of the tire, whereby the member when in operative relation defines a curved member rigid in one direction and relatively foldable in the opposite direction.

In testimony whereof I affix my signature.

ROYAL E. MARTIN.